United States Patent
Chen (10) Patent No.: US 9,124,623 B1
(45) Date of Patent: Sep. 1, 2015

(54) SYSTEMS AND METHODS FOR DETECTING SCAM CAMPAIGNS

(71) Applicant: Symantec Corporation, Mountain View, CA (US)

(72) Inventor: Joseph H. Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 40 days.

(21) Appl. No.: 13/923,108

(22) Filed: Jun. 20, 2013

(51) Int. Cl.
*G06F 12/14* (2006.01)
*H04L 29/06* (2006.01)

(52) U.S. Cl.
CPC ........ *H04L 63/1425* (2013.01); *H04L 63/1416* (2013.01); *H04L 63/1433* (2013.01)

(58) Field of Classification Search
None
See application file for complete search history.

(56) References Cited

U.S. PATENT DOCUMENTS

2007/0039038 A1* 2/2007 Goodman et al. ................ 726/2
2008/0046738 A1* 2/2008 Galloway et al. ............. 713/176

* cited by examiner

*Primary Examiner* — Fatoumata Traore
(74) *Attorney, Agent, or Firm* — Holland & Hart, LLP (57) ABSTRACT

A computer-implemented method for detecting scam campaigns is described. A plurality of web pages that are pre-filtered according to predetermined criteria is identified. Pattern detection is performed on the pre-filtered web pages. A pattern is detected among the pre-filtered web pages. The detected pattern is compared to a user input.

14 Claims, 9 Drawing Sheets

SYSTEMS AND METHODS FOR DETECTING SCAM CAMPAIGNS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies is always desirable to anyone who uses and relies on computers.

The wide-spread use of computers and mobile devices has caused an increased presence of email, text message, and web-based scams. One scam in particular involves scam artists setting up fake websites based on popular and/or trending information. For example, a scam artist may set up fake websites based on the release of a certain product from a company. When an unsuspecting user performs a web search for such a product, the fake websites may appear towards the top of the search results, leading some users to click on the fake websites believing these websites are sponsored by the company that released the product. The unsuspecting user may be tricked into providing sensitive data to the scam artist via these fake websites.

SUMMARY

According to at least one embodiment, a computer-implemented method detecting scam campaigns is described. A plurality of web pages that are pre-filtered according to predetermined criteria may be identified. The predetermined criteria may include a detected age of a file, a detected prevalence of a file, content from a file, an external link used in a file, a user reputation, a website reputation, a digital certificate, a detected request for personally identifiable information, associations between two or more elements of the predetermined criteria, and the like. Pattern detection may be performed on the pre-filtered web pages. A pattern is detected among the pre-filtered web pages. The detected pattern is compared to a user input. The user input may include a web query, a URL, an email, an instant message, a text message, a web form entry, an audio command, and the like.

In one example, text may be extracted from one or more of the pre-filtered web pages. Natural language processing may be performed on the extracted text in order to derive a meaning of the extracted text. A pattern may be detected among the pre-filtered web pages based on the derived meaning of the extracted text. Additionally, or alternatively, an image may be extracted from one or more of the pre-filtered web pages. Image analysis may be performed on the extracted image in order to recognize an aspect of the image. A pattern may be detected among the pre-filtered web pages based on the recognized aspect of the image.

In one embodiment, upon detecting the pattern among the pre-filtered web pages, the detected pattern may be stored in a database in order to build a repository of common scam campaign techniques. The repository of common scam campaign techniques may be accessed in real time relative to detecting a user generating the user input. Upon detecting a match between the detected pattern and the user input, a notification may be generated. The notification may include displaying a pop-up alert, sending an email, sending an instant message, sending a text message, blocking the user input, and the like.

A computing device configured to detect scam campaigns is also described. The device may include a processor and memory in electronic communication with the processor. The memory may store instructions that are executable by the processor to identify a plurality of web pages that are pre-filtered according to predetermined criteria, perform pattern detection on the pre-filtered web pages, detect a pattern among the pre-filtered web pages, and compare the detected pattern to a user input.

A computer-program product to detect scam campaigns is also described. The computer-program product may include a non-transitory computer-readable medium that stores instructions. The instructions may be executable by a processor to identify a plurality of web pages that are pre-filtered according to predetermined criteria, perform pattern detection on the pre-filtered web pages, detect a pattern among the pre-filtered web pages, and compare the detected pattern to a user input.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to detecting scam campaigns. More specifically, the systems and methods described herein relate to detecting patterns among pre-filtered web pages. The web pages may be pre-filtered based on predetermined criteria related to techniques of common scam campaign web pages. For example, the system may pre-filter the web pages based on text, images, external links, code, applets, forms, fields, requests for personal information contained within or associated with the web pages.

Scam campaigns tend to follow the latest online trends. For example, the release of a highly anticipated product may result in a significant increase of scam web pages related to the release of the anticipated product. The developers of the scam pages may use search engine optimization (SEO) techniques in order to place their web pages towards the top of search engine results. Thus, when a user who is interested in learning more about the product opens a browser, and enters the product name in a search engine, the scam web pages may appear towards the top of the search results. This may cause unsuspecting users to click on links to the product release scam web pages where they may be tricked into disclosing sensitive information (e.g., personal information, credit card number, social security number, bank account information, etc.). For example, a product release scam page may request sensitive information in exchange for a fake drawing to win the highly anticipated product. In a similar manner, a significant increase in scam charity web pages may occur in response to certain events, tricking unsuspecting users into giving away sensitive information and money through fraudulent transactions.

Because scam campaigns are constantly evolving to adapt to the latest online trends, current systems typically remain behind the curve when it comes to detecting such scams. By the time a current system detects a scam campaign, the scams have moved on to the next latest trend. In order to notify users of potential scams the present systems and methods may detect emerging scam campaigns and provide notification of potential scams in real time.

Figure 1:
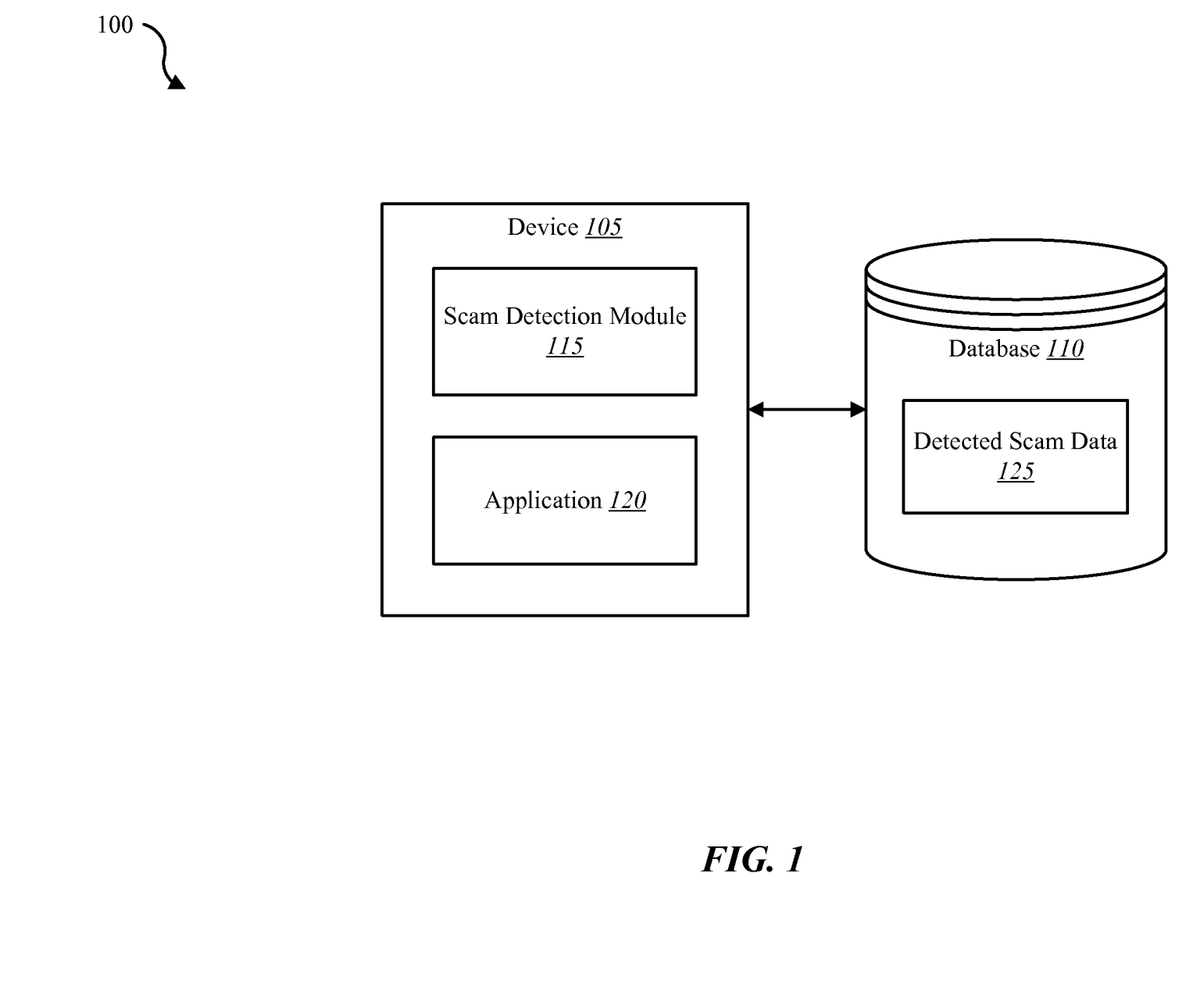
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a single device (e.g., device 105). For example, a scam detection module 115 may be located on the device 105. Examples of devices 105 include mobile devices, smart phones, personal computing devices, computers, servers, etc.

In some configurations, a device 105 may include a scam detection module 115 and an application 120. The application 120 may allow the device 105-a to interface with the scam detection module 115. In one example, the device 105 may be coupled to a database 110. In one embodiment, the database 110 may be internal to the device 105. In another embodiment, the database 110 may be external to the device 105. In some configurations, the database 110 may include detected scam data 125.

The scam detection module 115 may identify potential scam campaigns by searching pre-filtered web pages, detecting patterns among the pre-filtered web pages, and comparing a user input (e.g., web browser search term, text message, instant message, email, and the like) to the detected patterns in order to notify a user in real-time of potential scams. Further details regarding the scam detection module 115 are discussed below.

Figure 2:
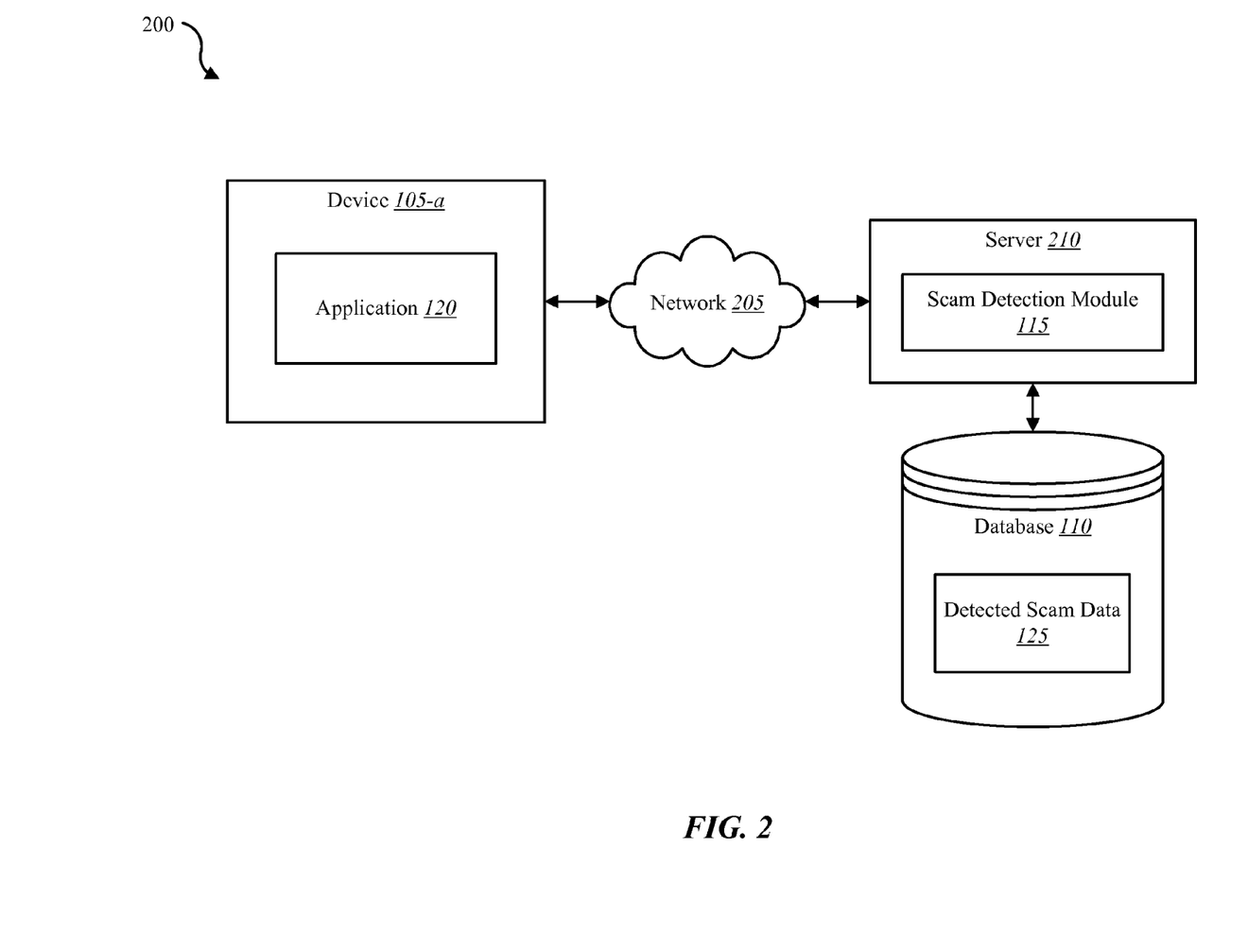
FIG. 2 is a block diagram illustrating another embodiment of an environment in which the present systems and methods may be implemented.

FIG. 2 is a block diagram illustrating another embodiment of an environment 200 in which the present systems and methods may be implemented. In some embodiments, a device 105-a may communicate with a server 210 via a network 205. Example of networks 205 include, local area networks (LAN), wide area networks (WAN), virtual private networks (VPN), wireless networks (using 802.11, for example), cellular networks (using 3G and/or LTE, for example), etc. In some configurations, the device 105-a may be one example of the device 105 illustrated in FIG. 1. It is noted that in some embodiments, the device 105-a may not include a scam detection module 115. For example, the device 105-a may include an application 120 that allows the device 105-a to interface with the scam detection module 115 located on server 210. In some embodiments, both the device 105-a and the server 210 may include a scam detection module 115 where at least a portion of the functions of the scam detection module 115 are performed separately and/or concurrently on both the device 105-a and the server 210.

In some embodiments, the server 210 may include the scam detection module 115 and may be coupled to the database 110. For example, the scam detection module 115 may access the detected scam data 125 in the database 110 via the server 210. The database 110 may be internal or external to the server 210.

In some configurations, the application 120 may enable the device 105-a to interface with the scam detection module 115 to identify potential scam campaigns by searching pre-filtered web pages, detect patterns among the pre-filtered web pages, and compare a user input to the detected patterns in order to notify a user in real-time of potential scams. Thus, the application 120, via the scam detection module 115, may identify and warn users of potential scam campaigns.

Figure 3:
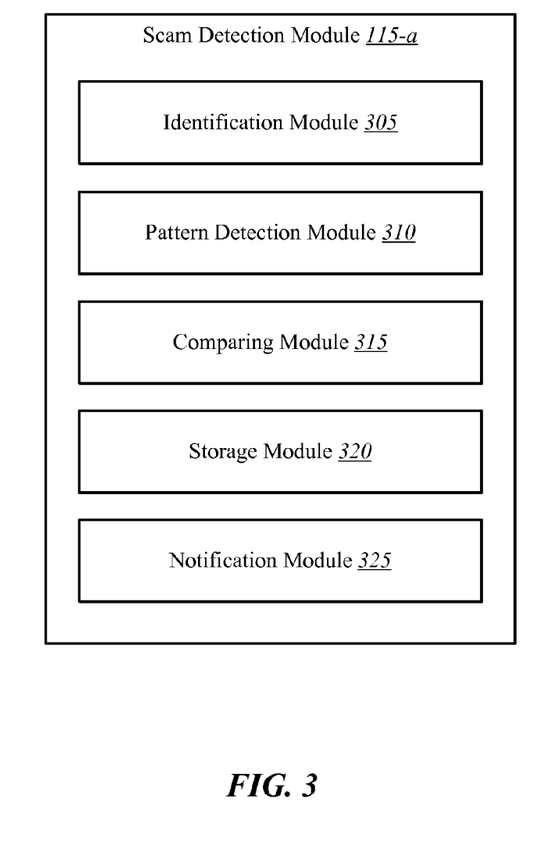
FIG. 3 is a block diagram illustrating one example of a scam detection module.

FIG. 3 is a block diagram illustrating one example of a scam detection module 115-a. The scam detection module 115-a may be one example of the scam detection module 115 depicted in FIGS. 1 and/or 2. As depicted, the scam detection module 115-a may include an identification module 305, a pattern detection module 310, a comparing module 315, a storage module 320, and a notification module 325.

The scam detection module 115-a may select a group of web pages. The scam detection module 115-a may analyze the group of web pages and filter out those websites that satisfy predetermined criteria. The predetermined criteria may include at least one of a detected age of a file (e.g., a file associated with a web page), a detected prevalence of a file, content from a file, an external link used in a file, a reputation of a user associated with a web page, a website reputation, a digital certificate, a detected request for personally identifiable information, and associations between two or more elements of the predetermined criteria.

In one embodiment, the identification module 305 may identify a plurality of web pages that are pre-filtered according to the predetermined criteria. The pattern detection module 310 may perform pattern detection on the pre-filtered web pages. The pattern detection module 310 may recognize patterns among the pre-filtered web pages based on text and image analysis. For example, the pattern detection module 310 may determine that certain types of scam web pages commonly use one or more elements of text and/or phrases. The pattern detection module 310 may detect the commonly used text among the pre-filtered web pages and mark matching web pages as potential scams. The comparing module 315 may compare the detected pattern to a user input. The user input may include any one of entering a web query, entering a URL, sending or receiving an email, sending or receiving an instant message, sending or receiving a text message, an element of a web form entry, giving an audio command, and the like. For example, a user may activate a speech-to-text application and speak into a microphone of a mobile device to perform a web search. The comparing module 315 may compare the user's web search to the detected patterns and upon finding a match, may notify the user of a potential scam related to the web search results.

In one embodiment, upon detecting the pattern among the pre-filtered web pages, the storage module 320 may store the detected pattern in a database in order to build a repository of common scam campaign techniques. For example, the storage module 320 may store the detected patterns of scam campaigns as detected scam data 125 in database 110. Thus, the comparing module 315 may refer to the detected scam data 125 when performing comparisons of detected patterns and user input. In one embodiment, the comparing module 315, via the storage module 320, may access the repository of common scam campaign techniques in real time relative to detecting a user generating a user input. Upon detecting a match between the detected pattern and the user input, the notification module may generate a notification. In one embodiment, the generated notification may include at least one of displaying a pop-up alert, sending an email, sending an instant message, sending a text message, and blocking the user input.

Figure 4:
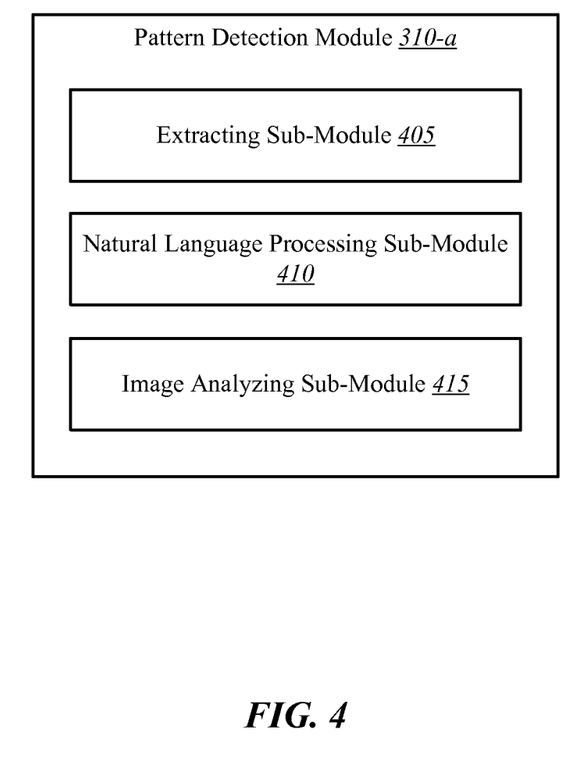
FIG. 4 is a block diagram illustrating one example of a pattern detection module.

FIG. 4 is a block diagram illustrating one example of a pattern detection module 310-*a*. The pattern detection module 310-*a* may be one example of the pattern detection module 310 illustrated in FIG. 3. As depicted, the pattern detection module 310-*a* may include an extracting sub-module 405, a natural language processing sub-module 410, and an image analyzing sub-module 415.

In one embodiments, extracting sub-module 405 may be configured to extract data from a web page, including text, images and image characteristics, software code, other web resources, and the like. Natural language processing sub-module 410 may be configured to process text and code extracted from a web page. Image analyzing sub-module 415 may be configured to process images extracted from a web page and identify image characteristics in the processed images. Further details regarding the sub-modules of FIG. 4, and the scam detection module 115 in general, are discussed below with regard to FIG. 5.

Figure 5:
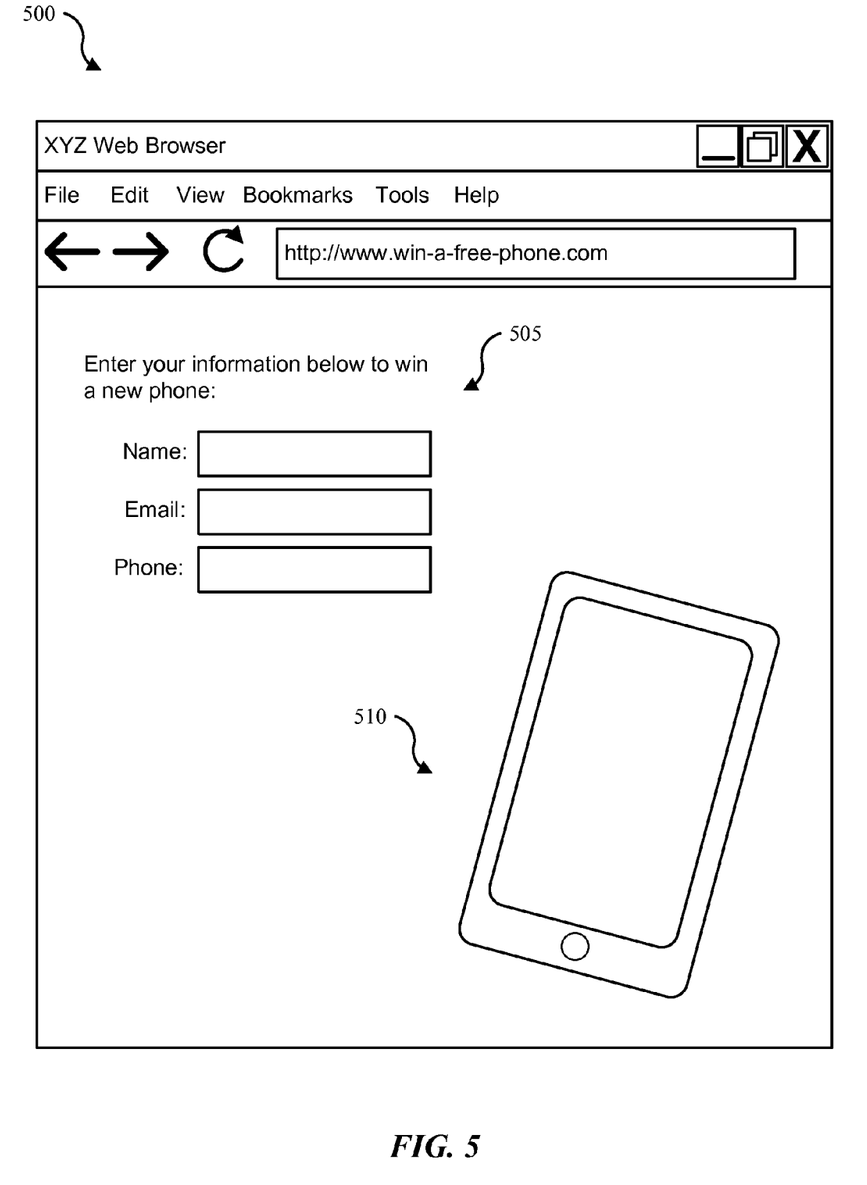
FIG. 5 illustrates an example arrangement of a web page under evaluation.

FIG. 5 illustrates an example arrangement of a web page under evaluation 500. The depicted web page under evaluation 500 may be one example of a web page that the scam detection module 115 pre-filters from a group of web pages. The depicted web page under evaluation 500 may include one or more web resources. For example, web page under evaluation 500 may include text 505 and an image 510. The web page under evaluation 500 may include one or more images in addition to image 510. Text 505 may include text fields, web forms, external links, software code, and other text-based information typically associated with a web page.

With reference to FIGS. 4 and 5, in one example, extracting sub-module 405 may extract elements of text from text 505. The natural language processing sub-module 410 may perform natural language processing on the extracted text in order to derive a meaning of the extracted text. Natural language processing sub-module 410 may analyze website name and title information, website owner information, text contained within or associated with one or more web pages, software code (e.g., hyper text markup language (HTML), JAVASCRIPT®, etc.), web forms and text fields, and the like in order to decipher meaning from text associated with a website. In one embodiment, pattern detection module 310-*a* may detect a pattern among the pre-filtered web pages based on the derived meaning of the extracted text.

Additionally, or alternatively, extracting sub-module 410 may extract image 510 from the web page under evaluation 500. The image analyzing sub-module 415 may perform image analysis on the extracted image in order to recognize an aspect or characteristic of image 510. For example, the image analyzing sub-module 415 may recognize any combination of colors, tones, contrasts, lines, edges, points, shapes, objects (e.g., images of text, symbols, products, logos, etc.), and the like in order to recognize one or more characteristics of image 510. In one embodiment, pattern detection module 310-*a* may detect a pattern among the pre-filtered web pages based on the recognized aspect of image 510. Thus, scam detection module 115 may be enabled to recognize elements of text and characteristics of images associated with a website under evaluation and determine that the text and/or images are the same or similar to text and/or images used in a website previously determined to be associated with a scam. As a result, scam detection module 115 may mark the website under evaluation as part of a potentially emerging scam campaign and generate notifications to user accordingly.

Figure 6:
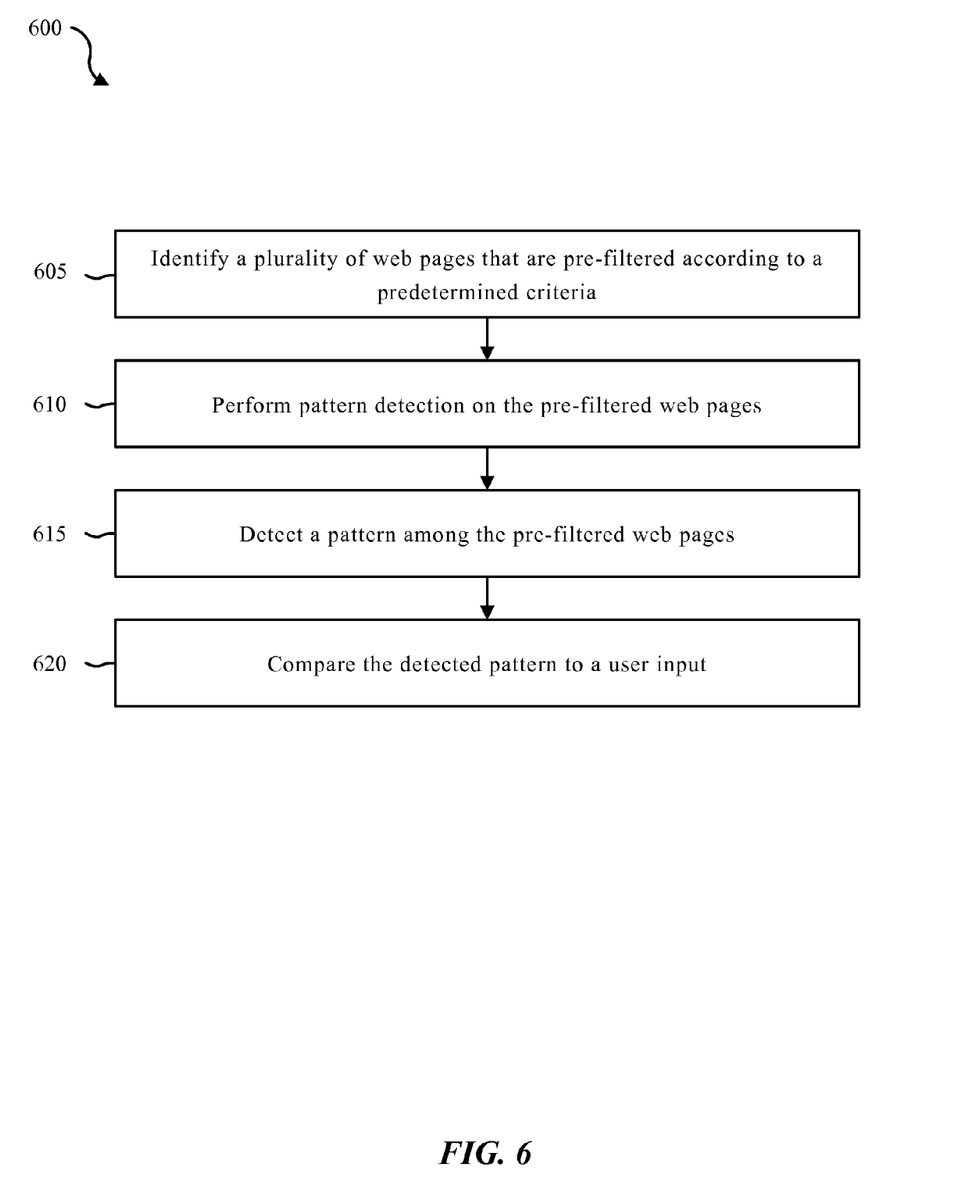
FIG. 6 is a flow diagram illustrating one embodiment of a method for detecting scam campaigns.

FIG. 6 is a flow diagram illustrating one embodiment of a method 600 for detecting scam campaigns. In some configurations, the method 600 may be implemented by the scam detection module 115 illustrated in FIGS. 1, 2, and/or 3. In some configurations, the method 600 may be implemented by the application 120 illustrated in FIG. 2.

At block 605, a plurality of web pages that are pre-filtered according to a predetermined criteria may be identified. At block 610, pattern detection may be performed on the pre-filtered web pages. At block 615, a pattern may be detected among the pre-filtered web pages. At block 620, the detected pattern may be compared to a user input.

Figure 7:
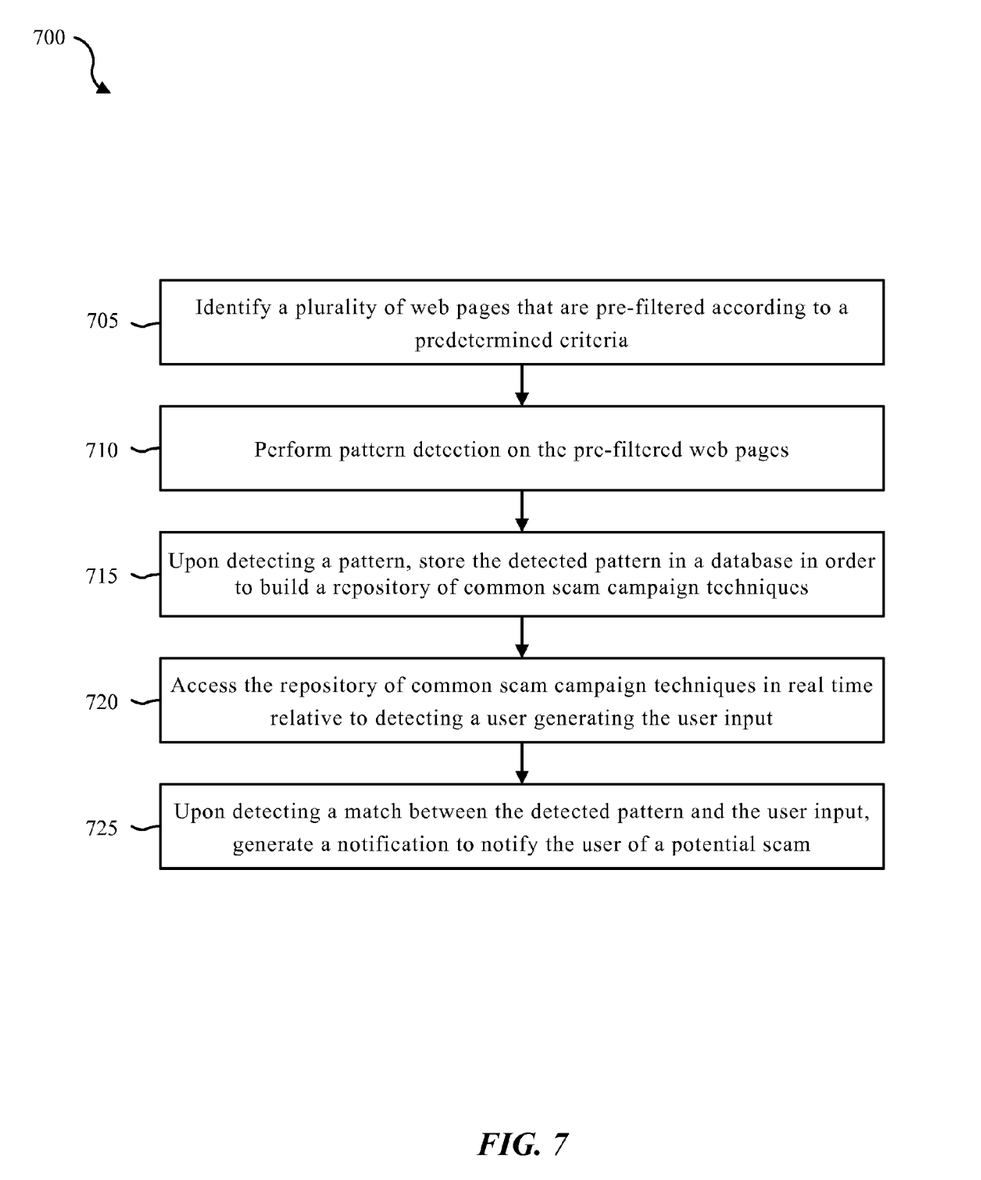
FIG. 7 is a flow diagram illustrating one embodiment of a method for notifying users of potential scam campaigns.

FIG. 7 is a flow diagram illustrating one embodiment of a method 700 for querying a pre-filter in relation to scanning data. In some configurations, the method 700 may be implemented by the scam detection module 115 illustrated in FIGS. 1, 2, and/or 3. In some configurations, the method 700 may be implemented by the application 120 illustrated in FIG. 2.

At block 705, a plurality of web pages that are pre-filtered according to a predetermined criteria may be identified. At block 710, pattern detection may be performed on the pre-filtered web pages. At block 715, upon detecting a pattern, the detected pattern may be stored in a database in order to build a repository of common scam campaign techniques. At block 720, the repository of common scam campaign techniques may be accessed in real time relative to detecting a user generating the user input. At block 725, upon detecting a match between the detected pattern and the user input, a notification may be generated to notify the user of a potential scam.

Figure 8:
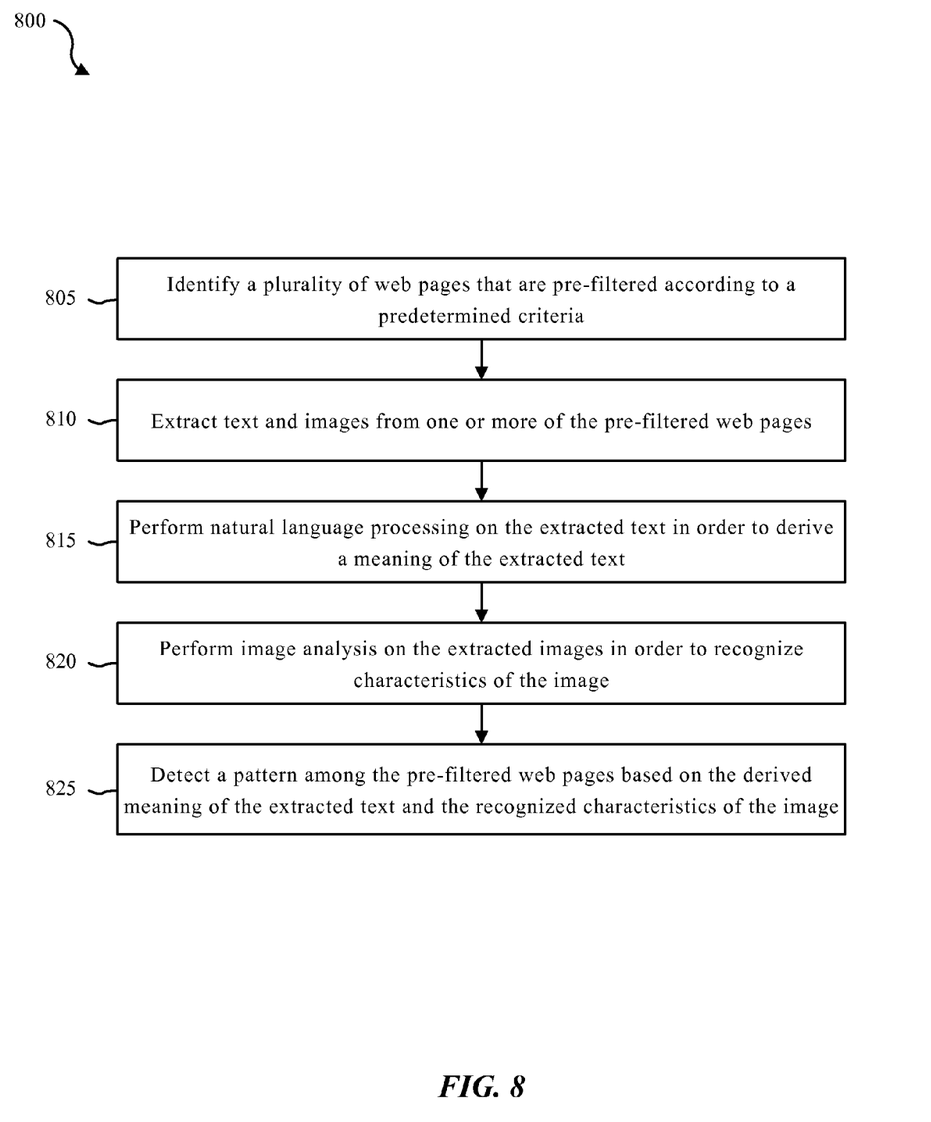
FIG. 8 is a flow diagram illustrating one embodiment of a method for scanning multiple hashes in relation to scanning data.

FIG. 8 is a flow diagram illustrating one embodiment of a method 800 for detecting patterns among pre-filtered web pages. In some configurations, the method 800 may be implemented by the scam detection module 115 illustrated in FIGS. 1, 2, and/or 3. In some configurations, the method 800 may be implemented by the application 120 illustrated in FIG. 2.

At block 805, a plurality of web pages that are pre-filtered according to a predetermined criteria may be identified. At block 810, text and images may be extracted from one or more of the pre-filtered web pages. At block 815, natural language processing may be performed on the extracted text in order to derive a meaning of the extracted text. At block 820, image analysis may be performed on the extracted images in order to recognize characteristics of the image. At block 825, a pattern among the pre-filtered web pages may be detected based on the derived meaning of the extracted text and the recognized characteristics of the image.

Figure 9:
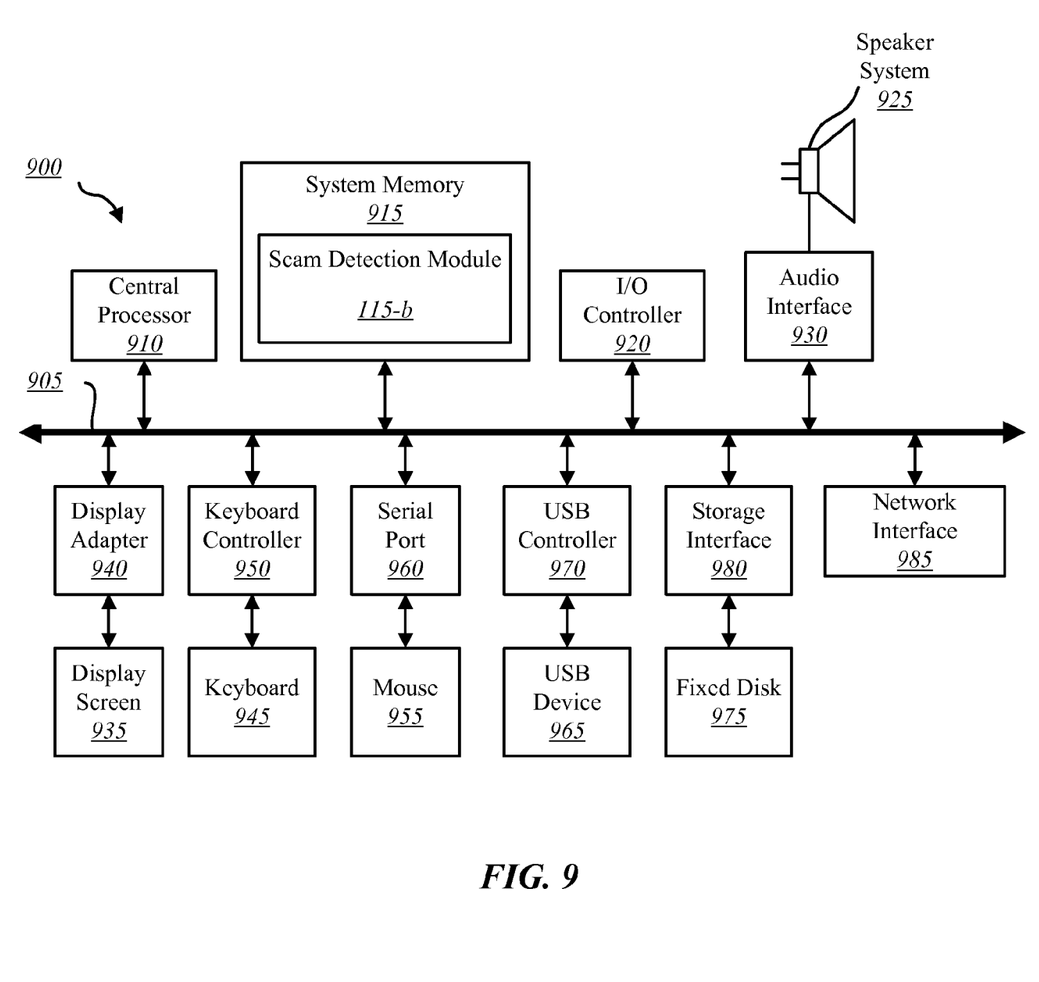
FIG. 9 depicts a block diagram of a computer system suitable for implementing the present systems and methods.

FIG. 9 depicts a block diagram of a computer system 900 suitable for implementing the present systems and methods. Computer system 900 includes a bus 905 which interconnects major subsystems of computer system 900, such as a central processor 910, a system memory 915 (typically RAM, but which may also include ROM, flash RAM, or the like), an input/output controller 920, an external audio device, such as a speaker system 925 via an audio output interface 930, an external device, such as a display screen 935 via display adapter 940, a keyboard 945 (interfaced with a keyboard controller 950) (or other input device), multiple USB devices 965 (interfaced with a USB controller 970), and a storage interface 980. Also included are a mouse 955 (or other point-and-click device) connected to bus 905 through serial port 960 and a network interface 985 (coupled directly to bus 905).

Bus 905 allows data communication between central processor 910 and system memory 915, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the scam detection module 115-*b* to implement the present systems and methods may be stored within the system memory 915. Applications (e.g., application 120) resident with computer system 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via interface 985.

Storage interface 980, as with the other storage interfaces of computer system 900, can connect to a standard computer readable medium for storage and/or retrieval of information, such as a fixed disk drive 975. Fixed disk drive 975 may be a part of computer system 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in a non-transitory computer-readable medium such as one or more of system memory 915 or fixed disk 975. The operating system provided on computer system 900 may be iOS®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for detecting scam campaigns, the method comprising:
    identifying a plurality of web pages that are pre-filtered according to predetermined criteria;
    performing pattern detection on the pre-filtered web pages;
    extracting at least one of text and an image from one or more of the pre-filtered web pages;
    performing at least one of natural language processing on the extracted text to derive a meaning of the extracted text and image analysis on the extracted image to recognize an aspect of the image;
    detecting a pattern among the pre-filtered web pages based on at least one of the derived meaning of the extracted text and the recognized aspect of the image;
    comparing the detected pattern to a user input;
    accessing the repository of common scam campaign techniques in real time relative to detecting a user generating the user input; and
    upon detecting the pattern among the pre-filtered web pages, storing the detected pattern in a database in order to build a repository of common scam campaign techniques.

2. The method of claim 1, further comprising:
    upon detecting a match between the detected pattern and the user input, generating a notification.

3. The method of claim 2, wherein the notification comprises at least one of displaying a pop-up alert, sending an email, sending an instant message, sending a text message, and blocking the user input.

4. The method of claim 1, wherein the user input comprises at least one of a web query, a URL, an email, an instant message, a text message, a web form entry, and an audio command.

5. The method of claim 1, wherein the predetermined criteria comprises at least one of a detected age of a file, a detected prevalence of a file, content from a file, an external link used in a file, a user reputation, a website reputation, a digital certificate, a detected request for personally identifiable information, and associations between two or more elements of the predetermined criteria.

6. A computing device configured to detect scam campaigns, comprising:
    a processor;
    memory in electronic communication with the processor;
    instructions stored in the memory, the instructions being executable by the processor to:
        identify a plurality of web pages that are pre-filtered according to predetermined criteria;
        perform pattern detection on the pre-filtered web pages;
        extract at least one of text and an image from one or more of the pre-filtered web pages;
        perform at least one of natural language processing on the extracted text to derive a meaning of the extracted text and image analysis on the extracted image to recognize an aspect of the image;
        detect a pattern among the pre-filtered web pages based on at least one of the derived meaning of the extracted text and the recognized aspect of the image;
        compare the detected pattern to a user input;
        access the repository of common scam campaign techniques in real time relative to detecting a user generating the user input; and
        upon detecting the pattern among the pre-filtered web pages, store the detected pattern in a database in order to build a repository of common scam campaign techniques.

7. The computing device of claim 6, wherein the instructions are executable by the processor to:
    upon detecting a match between the detected pattern and the user input, generate a notification.

8. The computing device of claim 7, wherein the notification comprises at least one of displaying a pop-up alert, sending an email, sending an instant message, sending a text message, and blocking the user input.

9. The computing device of claim 6, wherein the user input comprises at least one of a web query, a URL, an email, an instant message, a text message, a web form entry, and an audio command.

10. The computing device of claim 6, wherein the predetermined criteria comprises at least one of a detected age of a file, a detected prevalence of a file, content from a file, an external link used in a file, a user reputation, a website reputation, a digital certificate, a detected request for personally identifiable information, and associations between two or more elements of the predetermined criteria.

11. The computing device of claim 6, wherein the database having the repository of common scam campaign techniques is any of internal to the device or external to the device.

12. The computing device of claim 6, further comprising an application, wherein the application includes instructions executable by the processor to:
    interface with an external scam detection module to identify potential scam campaigns by searching the plurality of pre-filtered web pages, detecting patterns among the plurality of pre-filtered web pages, and comparing the user input to the detected patterns in order to notify the user in real time of a potential scam.

13. A computer-program product for detecting, by a processor, scam campaigns, the computer-program product comprising a non-transitory computer-readable medium storing instructions thereon, the instructions being executable by the processor to:
    identify a plurality of web pages that are pre-filtered according to predetermined criteria;
    perform pattern detection on the pre-filtered web pages;
    extract at least one of text and an image from one or more of the pre-filtered web pages;
    perform at least one of natural language processing on the extracted text to derive a meaning of the extracted text and image analysis on the extracted image to recognize an aspect of the image;
    detect a pattern among the pre-filtered web pages based on at least one of the derived meaning of the extracted text and the recognized aspect of the image;
    compare the detected pattern to a user input;
    access the repository of common scam campaign techniques in real time relative to detecting a user generating the user input; and
    upon detecting a pattern, store the detected pattern in a database in order to build a repository of common scam campaign techniques.

14. The computer-program product of claim 13, wherein the instructions are executable by the processor to:

upon detecting a match between the detected pattern and the user input, generate a notification to notify the user of a potential scam.

* * * * *